(12) United States Patent
Turner et al.

(10) Patent No.: US 11,720,884 B2
(45) Date of Patent: Aug. 8, 2023

(54) POINT-OF-SALE CONSUMER RESOLUTION SYSTEM

(71) Applicant: Acxiom LLC, Conway, AR (US)

(72) Inventors: Joyce Turner, Collierville, TN (US); Shawn Gilleran, Conway, AR (US); Sandy Payton, North Little Rock, AR (US); Joel Pettit, Conway, AR (US)

(73) Assignee: Acxiom LLC, Conway, AR (US)

( * ) Notice: Subject to any disclaimer, the term of this patent is extended or adjusted under 35 U.S.C. 154(b) by 190 days.

(21) Appl. No.: 17/276,440

(22) PCT Filed: Aug. 22, 2019

(86) PCT No.: PCT/US2019/047666
§ 371 (c)(1),
(2) Date: Mar. 15, 2021

(87) PCT Pub. No.: WO2020/185251
PCT Pub. Date: Sep. 17, 2020

(65) Prior Publication Data
US 2022/0058620 A1    Feb. 24, 2022

Related U.S. Application Data

(60) Provisional application No. 62/815,686, filed on Mar. 8, 2019.

(51) Int. Cl.
*G06Q 20/36* (2012.01)
*G06Q 20/20* (2012.01)
*G06Q 20/40* (2012.01)

(52) U.S. Cl.
CPC ......... *G06Q 20/363* (2013.01); *G06Q 20/202* (2013.01); *G06Q 20/4014* (2013.01)

(58) Field of Classification Search
CPC ............... G06Q 20/363; G06Q 20/202; G06Q 20/4014; G06Q 20/40146; G06K 5/00
(Continued)

(56) References Cited

U.S. PATENT DOCUMENTS

| 6,073,140 A | 6/2000 | Morgan et al. |
| 6,424,949 B1 | 7/2002 | Deaton et al. |

(Continued)

FOREIGN PATENT DOCUMENTS

WO    2018140836 A1    8/2018

OTHER PUBLICATIONS

Wikipedia "Address Verification Service," retrieved from https://en.wikipedia.org/w/index.php?title-Address_verification_service&oldid=877896144 (Jan. 11, 2019).
(Continued)

*Primary Examiner* — Ariel J Yu
*Assistant Examiner* — Denisse Y Ortiz Roman

(57) ABSTRACT

A system for identifying a consumer at a retailer point of sale (POS) incorporates a virtual wallet database that contains consumer records. A consortium processor utilizes a database or databases with information known to the electronic tender provider but not available to the virtual wallet database. If the identifying data from the retailer POS hardware does not match any data from the virtual wallet database, an enhanced trade area append processor is employed to find a matching consumer within the retailer POS trade area. If a match is found, the applicable address is attached to the consumer data captured at the POS. A record is then sent to the consortium processor, which compares this data to its own records and returns a match or no-match result. The virtual wallet database is updated based on the match results.

36 Claims, 3 Drawing Sheets

(58) Field of Classification Search
USPC .......................................... 705/21, 14, 14.1
See application file for complete search history.

(56) References Cited

U.S. PATENT DOCUMENTS

| | | |
|---|---|---|
| 8,095,445 B2 | 1/2012 | Talbert et al. |
| 8,214,265 B2 | 7/2012 | Peters |
| 2004/0172339 A1 | 9/2004 | Snelgrove et al. |
| 2006/0053056 A1* | 3/2006 | Alspach-Goss ........ G06Q 30/06 705/14.27 |
| 2006/0065716 A1* | 3/2006 | Peters .................. G06Q 10/087 235/380 |
| 2006/0161490 A1 | 7/2006 | Chakiris et al. |
| 2007/0219852 A1 | 9/2007 | Anglum |
| 2011/0191140 A1 | 8/2011 | Newman et al. |
| 2011/0202465 A1 | 8/2011 | Mashhour |
| 2014/0074637 A1* | 3/2014 | Hammad ............. G06Q 20/351 705/41 |
| 2015/0088752 A1 | 3/2015 | Howe |

OTHER PUBLICATIONS

Extended European Search Report for Application No. 19918812.9 (dated Oct. 17, 2022).
"Integrated Retail Store Management System, a Technical and Functional Description," Singular Logic (Feb. 2013).

* cited by examiner

POINT-OF-SALE CONSUMER RESOLUTION SYSTEM

TECHNICAL FIELD

This invention pertains to the field of networked hardware, data structures, and automated methods associated with point-of-sale automated data collection, and more particularly to such data structures and methods for resolving the identity of consumers interacting with an automated point-of-sale (POS) system.

BACKGROUND ART

References mentioned in this background section are not admitted to be prior art with respect to the present invention.

Retailers operating brick-and-mortar stores have long recognized that it would be advantageous to identify consumers who make a purchase at a particular point of sale (POS). With this information, the retailer could recognize its most valued customers and offer them special incentives, and also may be able to more precisely target its marketing efforts to consumers based on their purchase history with the retailer. If the consumer utilizes an electronic enabled tender type, such as a debit card, credit card, electronic wallet, or electronic check, then the retailer may learn the name of the consumer through this transaction. This information is pulled from the tender method using electronic POS systems. But the name alone does not allow the retailer to uniquely identify a consumer because names are not unique, and thus the retailer has no way of knowing which of any number of consumers who share that name actually made the purchase.

One attempt to overcome this problem is the issuance of loyalty cards or similar electronic devices to consumers. In this approach, the retailer maintains a database that associates the code on each loyalty card with the particular consumer to whom the card is issued. This database is linked with the retailer's POS systems. When a purchase is made, the consumer is enticed to present the card at the POS in order to receive discounts, loyalty points, or the like. The retailer can unambiguously identify a consumer at the POS using this method, but the method requires the consumer to present the loyalty card at each purchase. Many consumers do not like using loyalty cards, or they may lose or misplace their cards, in which case no data may be captured at the POS concerning the consumer and the consumer's purchases.

Another attempt to overcome this problem is known as trade area append. This approach utilizes a broad-based consumer database containing matched names, addresses, and various other data about consumers within a certain jurisdiction. For example, one such database is the InfoBase database maintained by Acxiom LLC, which tracks a large range of demographic and other data about consumers in the United States. The trade area append approach takes the consumer name derived from the tender data received at the POS, and then looks for a record in the consumer database with both a matching name and a residential address that is within a defined trade area around the physical location of the retailer POS. If a match is found, then this consumer is presumed to be the purchaser because consumers shopping at a brick-and-mortar retailer are likely to reside in the area near the retail location.

The trade area append approach has a number of shortcomings. First, duplicate consumer names may be found within the defined trade area. In this case, there is no additional data by which the system may break the "tie" between the different consumers in the trade area with the same name, and so it is impossible to determine which of these consumers engaged in the purchase transaction. Reducing the size of the trade area lessens the risk of duplicate consumer names being returned, but also increases the risk that a consumer may be entirely missed. Second, a consumer may reside outside of the trade area and nevertheless be shopping at a particular retailer. This may occur, for example, when the consumer is travelling, or the consumer may simply be willing to travel farther than expected in order to shop at a retailer the consumer finds particularly desirable. In this case, the trade area append approach may return no hits. Third, even if a single name is returned by trade area append, it is possible that the consumer who engaged in the transaction resides outside of the trade area and just happens to have the same name as a single consumer who does reside in the trade area. In this case, the trade area append approach will return a single result, but the result will be incorrect.

Due to the limitations of existing systems for resolving consumer identity based on tender data at a retailer POS, an improved database structure and electronic system to perform this function, which is capable of unambiguously resolving the identity of the consumer more accurately than trade area append yet without the requirement of loyalty cards, would be highly desirable.

DISCLOSURE OF INVENTION

The present invention is directed to an improved system and method for identifying a consumer at a retailer POS that incorporates a virtual wallet database and a consortium processor into a network. The virtual wallet database contains consumers' names, addresses, card data, and other identifiers. The consortium processor, which utilizes a database or databases not directly accessible by the retailer, maintains information known to the provider of the electronic tender method utilized by the consumer. In order to protect the privacy of consumers, applicable regulations in many jurisdictions prevent such providers from supplying to the retailer the full data maintained in their databases. The consortium processor may be maintained by, or utilize data provided by, a consortium of financial services providers, including but not limited to the various entities that issue credit cards. Alternatively, or in addition to, the financial services providers, the consortium may include payment processors, which are companies appointed by a merchant to handle transactions for banks; TSYS is one example of a payment processor.

In certain implementations, the system first checks tender data from a retailer POS against the virtual wallet database. If a match is found, then the consumer identity is confirmed. If there is no match from the virtual wallet database, then a trade area append routine is employed in an effort to find a matching consumer within the retailer POS trade area. If no match is found, then the record is flagged as unidentified. If a match is found using trade area append, the applicable address is attached to the consumer data captured at the POS, and this record is sent to the consortium. The consortium compares this data to its own records, and returns a simple match or no-match (i.e., "yes" or "no") result. The virtual wallet database is then updated with newly identified consumers or a new tender type is added to an existing record for a consumer in the database, as applicable. In the case of multiple potential matches, the process may be run multiple times up to the match request at the consortium.

These and other features, objects and advantages of the present invention will become better understood from a consideration of the following detailed description in conjunction with the drawings as described following:

BEST MODE FOR CARRYING OUT THE INVENTION

Before the present invention is described in further detail, it should be understood that the invention is not limited to the particular implementations described herein, and that the terms used in describing the particular implementations are for the purpose of describing those particular implementations only, and are not intended to be limiting. The scope of the present invention will be limited only by the claims.

Figure 1:
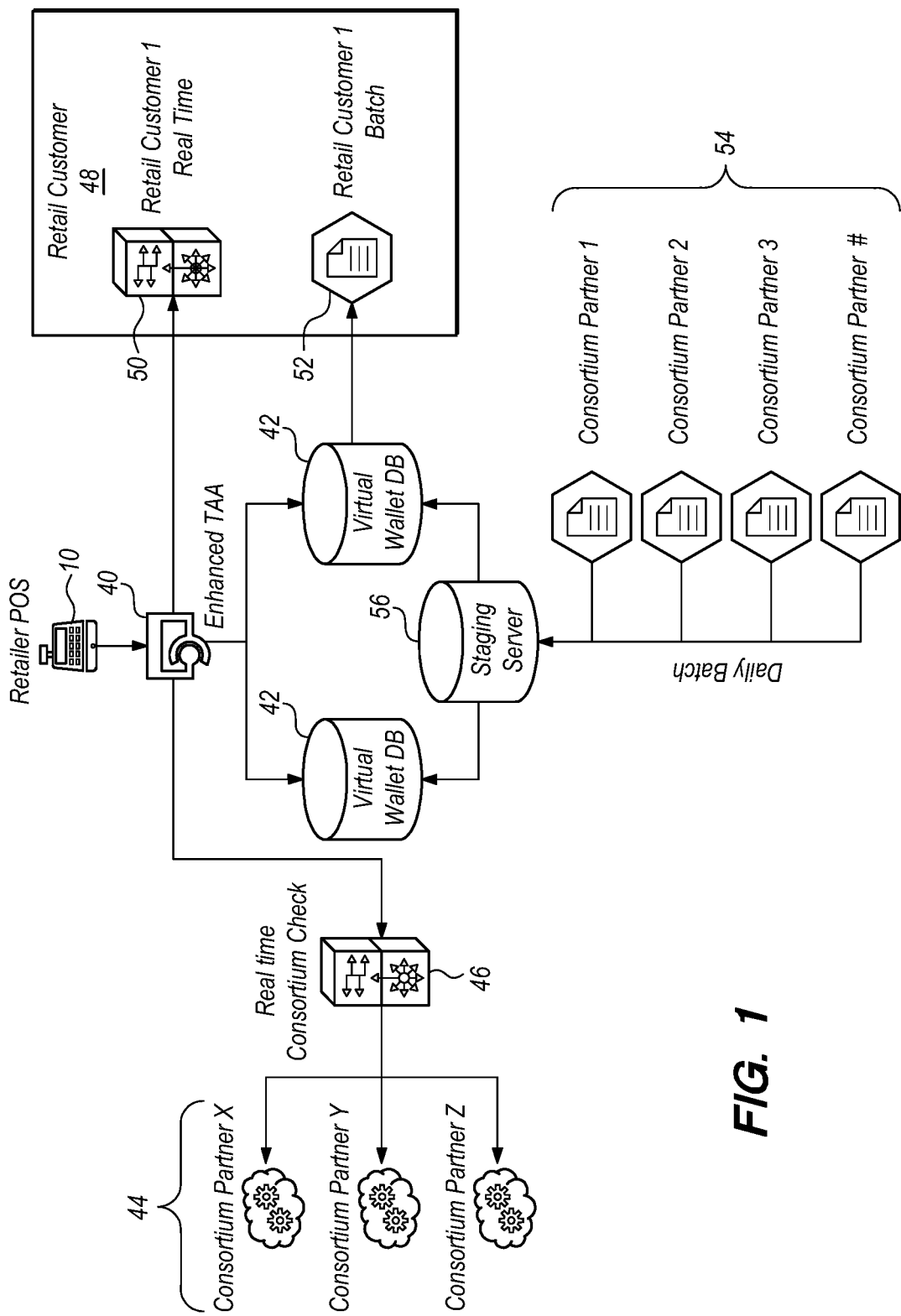
FIG. 1 is a schematic illustrating the components of a system according to an implementation of the invention.

Referring to FIG. 1, the major components of a system used to implement the present invention according to one implementation may be described. The retailer point of sale (POS) system 10 refers to the electronic systems and network components physically located at the retail location where a consumer makes a purchase, and where the tender information (such as card number and issuer information) are ingested while processing payment for the goods or services provided to the consumer. Retailer POS system may, for example, be a card reader networked to a register at the retailer point of sale, but in other embodiments may consist of any method for a retailer to receive electronic payment information for a transaction. This data is passed via an electronic network to an "enhanced" trade area append (TAA) processor 40, which may be implemented as software executing on a computer server or servers. TAA processor 40 is maintained by the provider of the consumer resolution service, and its functions are more fully described with reference to FIG. 2 below.

TAA processor 40 communicates with the consortium check processor 46 in order to bounce the prospective identifier (e.g., consumer name/address or, for cards with embedded chips, an encrypted packet) match against the one or more consortium processor databases 44 in order to determine if the prospective identifier match is in fact correct. This processing only occurs if electronic payment data is received in a transaction with a consumer whose data is not already found in a record at one or more virtual wallet databases 42, which are in communication with TAA processor 40. It may be noted that although two virtual wallet databases are illustrated in FIG. 1, the system can include any number of physically separate databases in order to implement the functionality of virtual wallet databases 42. Virtual wallet databases 42 track the matched name, address, card data, and other information for a consumer that was gained through previous transactions, and also allow for updates from TAA processor 40 once a new match is made.

As will be explained in more detail below with reference to FIG. 2, TAA processor 40 may, in some implementations, be in communication with a comprehensive computer database or databases, such as may be made available from a third-party data services provider. The comprehensive computer database provides address data for a consumer if there is no record corresponding to that consumer in the one or more virtual databases 42. This information is passed to real-time consortium check processor 46. Alternatively, the retailer may maintain its own database that serves the same purpose as a data provider comprehensive computer database. The information in this retailer database may be populated with data from a data services provider, or may be collected in any alternative manner.

Real-time consortium check processor 46 serves as a front end to one or more consortium partner processors 44. It receives a message from TAA processor 40 in order to check whether the candidate identifier (e.g., name/address) match for a particular consumer does in fact correspond to a consumer with the particular tender data presented electronically to retailer POS system 10. Each of the consortium partner processors receives the tender data, and compares it to its own internal databases. These databases may, for example, be consumer databases maintained by credit card issuers. This type of data cannot be made directly available to retailer systems in order to protect the privacy of the consumer card holders. Card issuers are required by applicable regulations to protect this information. The real-time consortium check processor 46 thus serves as an intermediary that protects against any possible disclosure of information between the consortium partners and the retailer.

TAA processor 40 can send a message to retailer system 48 at customer real-time intake process 50 in order to provide the retailer with information that is gained after a successful real-time check at consortium check processor 46. The system also allows for batch updates to retailer system 48 through batch intake process 52 from virtual wallet databases 42. In this implementation of the invention, a staging server 56 may be used to communicate batch information from consortium partner batch databases 54. This allows the invention to operate either in real-time mode, during which a check is made as to the correctness of the prospective identifier match while the transaction is processing, but also allows for the various updates to take place at a later time and the results delivered in batch mode. Batch mode updates may be delivered at regularly scheduled intervals, such as daily.

Figure 2:
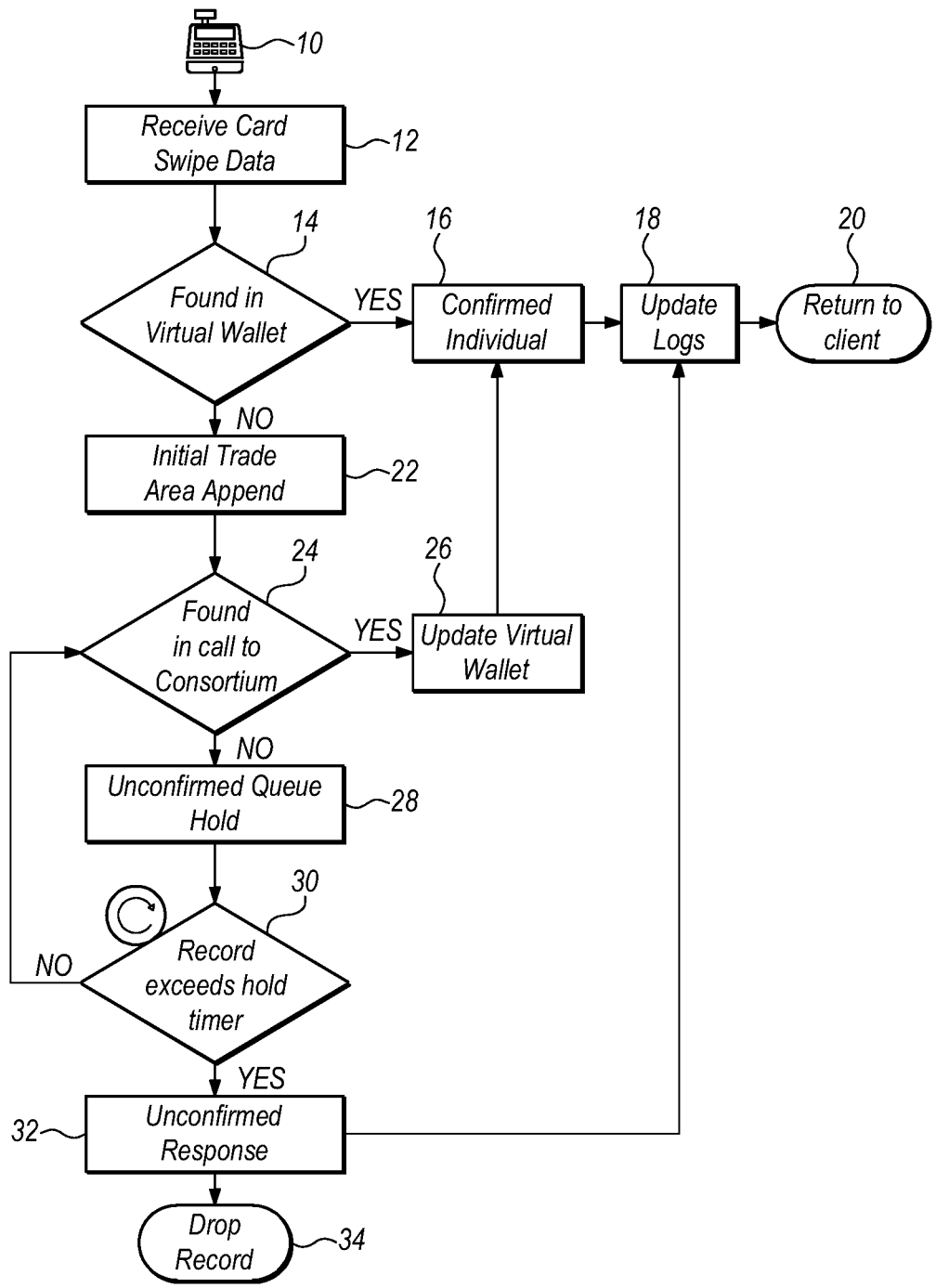
FIG. 2 is a flow chart illustrating the steps of a real-time method according to an implementation of the invention.

Turning now to FIG. 2, the steps in a real-time automated process using the system described with reference to FIG. 1 may now be described. Processing begins at POS system 10, where the identifier and tender data are received through some form of electronic payment at step 12. At decision block 14, the Enhanced TAA processor determines if the information input at POS system 10 matches a record already resident in a virtual wallet database 42. If so, then a confidence score for that consumer's identity is assigned at step 16, system logs are updated at step 18, and processing returns to the client (i.e., the retailer computer system) at step 20. No other matching is required in this case because this consumer has apparently already performed a transaction while the system was employed, whereby that consumer's data was previously added to a virtual wallet database 42.

If the information input at POS system 10 does not match a record already resident in a virtual wallet database 42, then at step 22 a trade area append process is performed. In this step, assuming the identifier is a consumer name, then the consumer's name is matched against a comprehensive consumer database containing consumer names and addresses. For each consumer record with a matching name that is found, the system then executes code to determine if that consumer resides within a defined trade area of the retailer. The trade area may be defined in any of a number of ways, such as a defined absolute distance from the retailer; a defined road-travel distance from the retailer; or a metropolitan statistical area in which the retailer is located. These examples are not limiting, and any number of other trade area definitions may be employed. The result of this step is a prospective match between the consumer name and an address for that consumer.

At step 23, it is determined if the consumer name is found as a result of the trade area append from decision block 23. If not, then a no-match result is returned at step 25, and processing proceeds to block 18 to update logs and then step 20 to return the result to the client as before. If the consumer name is found in the trade area step 22 as asked at decision block 23, then processing proceeds to decision block step 24, at which the prospective consumer name and address are sent to consortium check processor 46, and the returned data indicates whether or not this is a correct match. This returned data may include a string indicating a match, such as "yes" and "no" options or "Y" and "N" options, or may be a single bit, with options of "1" or "0" indicating whether a match was made. Any number of other means of communicating this information may be employed in other implementations.

If a match is returned by consortium check processor 46, then the virtual wallet database 42 is updated with the consumer tender data at block 26, and processing continues at step 16 as described above. In this case, the system has successfully identified an individual consumer despite the fact that the individual consumer was not present in a virtual wallet database 42. But because the virtual wallet databases 42 are updated at step 26, subsequent processing with respect to this consumer using this particular tender data will result in a "yes" result at decision block 14, thereby avoiding the necessity of trade area append and the electronic communications to and from consortium check processor 46.

If, at decision block 24, the prospective consumer name and address are not yet confirmed as a match or no-match result based on the response from consortium check processor 46, then processing moves to step 28, where the prospective data is held in a queue for an unconfirmed match. A poll is conducted at decision block 30, checking to see if the time for the data being held in the queue exceeds a set time limit. If it does not, then processing moves back to step 22, where the trade area append is run again. Note that this process can be repeated any number of times based on the timer setting. It should also be noted that this process can be repeated for multiple prospective matches; for example, if the trade area append processing at step 22 returns two or more potential consumer name and address matches, then each of those may be checked at step 24 by communications to/from consortium check processor 46.

Once the timer is exceeded at decision block 30, then processing moves to block 16 to assign a confidence code, and then to step 26 to update the virtual wallet database with the matched consumer information. In addition, logs are updated at step 18, and processing returns to the client at block 20. The confidence codes are assigned based on the quality of the match. In one example, the following codes are assigned:
  400: found in virtual wallet
  300: name/address/consortium match
  220: name/address match
  200: name/consortium match
  150: address/consortium match
The logs are stored in a JSON format and holding the timing, unique transaction IDs, dates, status codes, match confidence, consortium member ID, and information sent to the services provider. Information returned from the services provider is used for tracking, reporting, and invoice creation.

Figure 3:
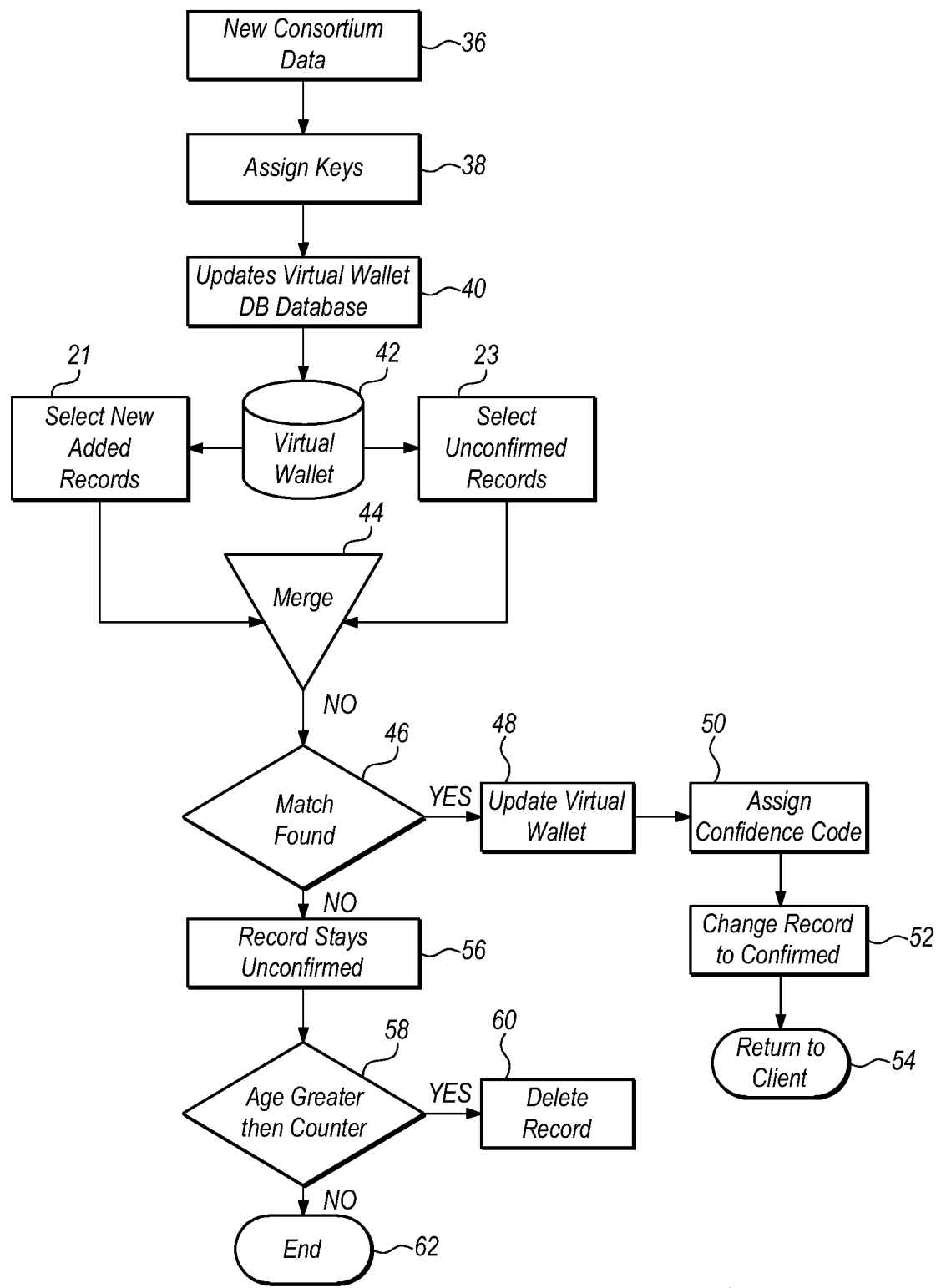
FIG. 3 is a flow chart illustrating the steps of a batch method according to an implementation of the invention.

Referring now to the flow diagram of FIG. 3, a batch mode operation can be described with respect to certain implementations of the present invention. Each consortium member can send updated data in refresh files, shown at block 36. The first step of the process is to attempt to assign a unique key based on information from the name, address, or other information on the record at step 38. This record will update the consortium database tables in the virtual wallet at step 40. After the new records are added, all existing unconfirmed records 23 are merged at step 44 with new added records 21. The purpose is to find new matches. If no match is found when the new records arrive, they remain unconfirmed records at step 56 and are checked to see if the data has reached contract expiration time at step 58. If the records are still within the contracted archive period, then there is no further processing and the process ends at step 62. If the records have reached the contracted archive period, then the record is marked for deletion in the virtual wallet database at step 60, and will be removed in the next maintenance window.

If a match is found at step 46, then the virtual wallet is updated at step 48, the correct confidence code is assigned at step 50, and the status of each such record is changed to confirmed at step 52. Processing then returns to the client at step 54.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is described herein, all individual members of the group and all combinations and subcombinations possible of the group are intended to be individually included in the disclosure. When a range is described herein, all subranges and individual points within that range are intended to be separately included in the disclosure. All references cited herein are hereby incorporated by reference to the extent that there is no inconsistency with the disclosure of this specification.

The present invention has been described with reference to certain preferred and alternative implementations that are intended to be exemplary only and not limiting to the full scope of the present invention, which is set forth solely in the appended claims.

The invention claimed is:

1. A networked system for resolving consumer identity at a point of sale, the system comprising:
  a retailer point-of-sale (POS) system, comprising a consumer data input subsystem, a consumer data output routine, and a payment approval subsystem;
  an enhanced trade area append processor in electronic communication with the retailer POS system, the enhanced trade area append processor comprising a consumer data input routine to receive consumer data from the retailer POS system, and a trade area append routine to determine if a consumer record received from the retailer POS system through the consumer data input routine matches one or more consumer names and associated consumer addresses found within a defined trade area;

at least one virtual wallet database in electronic communication with the enhanced trade area append processor, wherein the virtual wallet database comprises a plurality of consumer records, and wherein each consumer record comprises a consumer name and matched consumer address for consumers known to the retailer;

a consortium processor in electronic communication with the enhanced trade area append processor, the consortium processor comprising a real-time consortium check routine to return only a match or no match result for a consumer record received from the enhanced trade area processor, wherein the consortium processor utilizes a consortium database that is not accessible by the retailer POS system in order to perform the real-time consortium check routine.

2. The system of claim 1, wherein the consortium processor is maintained by a financial services consortium.

3. The system of claim 1, wherein the consortium processor is maintained by at least one payment processor.

4. The system of claim 1, further comprising at least one partner processor in electronic communication with the consortium processor configured to compare the consumer record received from the enhanced trade area processor to a plurality of partner consumer records in a partner processor database.

5. The system of claim 4, further comprising a retailer processor in electronic communication with the enhanced trade area append processor.

6. The system of claim 5, wherein the enhanced trade area append processor further comprises a real-time output routine to provide a real-time result to the retailer processor during a POS transaction at the retailer POS system.

7. The system of claim 6, further comprising a staging server in communication the at least one virtual wallet database, configured to transmit batch matching data from batch partner update files to the at least one virtual wallet database.

8. The system of claim 7, wherein the at least one virtual wallet database is in electronic communication with the retailer processor, and the at least one virtual wallet database comprises a virtual wallet database output routine to transmit batch matching data to the retailer processor.

9. The system of claim 8, further comprising a comprehensive consumer database in electronic communication with the enhanced trade area append processor.

10. The system of claim 9, wherein the enhanced trade area append processor further comprises a search routine to identify consumer records from the comprehensive consumer database that contain an address within the defined trade area.

11. A method of resolving consumer identity at a point of sale, comprising the steps of:

at an enhanced trade area append processor, receiving from a retailer point-of-sale (POS) system an electronic POS message comprising an identifier;

at the enhanced trade area append processor, searching a virtual wallet database in communication with the enhanced trade area append processor for a matching virtual wallet consumer record;

if a matching virtual wallet consumer record is found from searching the virtual wallet database, returning the matching virtual wallet consumer record to the enhanced trade area append processor;

if a matching virtual wallet consumer record is not found from searching the virtual wallet database, performing a trade area append to identify at least one full consumer record comprising both the identifier from the electronic message and an address within a defined trade area;

for each full consumer record identified, requesting from a consortium processor a consortium match result, wherein the consortium match result may only be either affirmative or negative, wherein the consortium processor communicates with a consortium database to generate the consortium match result, wherein the consortium database is not directly accessible by the retailer POS system; and for each full consumer record identified for which a consortium match result is affirmative, writing a new virtual wallet consumer record comprising at least a consumer name field and a consumer address field, and add the new virtual wallet consumer record to the virtual wallet database.

12. The method of claim 11, wherein the identifier comprises a name.

13. The method of claim 11, wherein the identifier comprises an encrypted packet.

14. The method of claim 11, further comprising the step of starting a timer when requesting a consortium match result.

15. The method of claim 14, further comprising the step of periodically repeating the step of requesting a consortium match result until the first to occur of either receiving the consortium match result or the timer reaching an expiration time.

16. The method of claim 11, further comprising the step of updating a log if a matching virtual wallet consumer record is found from searching the virtual wallet database.

17. The method of claim 15, further comprising the step of updating a log if the timer reaches the expiration time before the consortium match result is received.

18. The method of claim 11, wherein if a matching virtual wallet consumer record is found from searching the virtual wallet database, writing the matching virtual wallet consumer record to a retailer processor.

19. The method of claim 18, further comprising the step of reading electronic payment information at the retailer POS system using an electronic reader to produce the electronic POS message.

20. The method of claim 19, wherein the step of reading electronic payment information with the electronic reader comprises the step of reading an electronic payment card from a plurality of electronic payment card providers with the electronic reader.

21. The method of claim 11, further comprising the step of, for each full consumer record identified for which a consortium match result is affirmative, sending a consortium match result message to a retail processor.

22. The method of claim 21, wherein the consumer match result message comprises a matched consumer name field and a matched consumer address field.

23. The method of claim 22, wherein the step of sending a consortium match result message to the retail processor is performed in real time.

24. The method of claim 23, wherein the step of sending a consortium match result message is performed before a transaction at the retailer POS system is completed.

25. The method of claim 21, further comprising the step of periodically sending a batch file from the virtual wallet database to the retail processor, wherein the batch file comprises each new virtual wallet database record added to the virtual wallet database since the last periodically sent batch file.

26. The method of claim 25, wherein the period for the step of sending a batch vile from the virtual wallet database to the retail processor is daily.

27. The method of claim 25, further comprising the step of receiving at least one consortium partner batch file.

28. The method of claim 27, wherein the at least one consortium partner batch file is received at a staging server.

29. The method of claim 28, further comprising the step of creating a staging server consumer record for each consumer name listed in the at least one consortium partner batch file.

30. The method of claim 29, further comprising the step of communicating at least one staging server consumer record from the staging server to the virtual wallet database.

31. The method of claim 11, wherein the step of searching the virtual wallet database comprises the step of searching a plurality of virtual wallet databases.

32. The method of claim 20, wherein the consortium match result is received at a consortium check processor.

33. The method of claim 32, further comprising the step of, in response to the step of receiving a consortium match result at the consortium check processor, sending a request from the consortium check processor to each of a plurality of consortium partner processors.

34. The method of claim 33, further comprising the step of sending a consortium partner response from each of the plurality of consortium partner processors, wherein each of the consortium partner responses may be either affirmative or negative.

35. The method of claim 34, wherein if any of the consortium partner responses is affirmative, setting the consortium match result to positive.

36. The method of claim 35, wherein each of the consortium partner processors corresponds to a single electronic payment card provider.

* * * * *